United States Patent [19]

Morduchowitz et al.

[11] Patent Number: 4,541,937
[45] Date of Patent: Sep. 17, 1985

[54] SURFACTANT FLOODING SOLUTIONS WITH SULFONATED CREOSOTE

[75] Inventors: Abraham Morduchowitz, Monsey; Farrokh Yaghmaie, Wappingers Falls, both of N.Y.

[73] Assignee: Texaco Inc., White Plains, N.Y.

[21] Appl. No.: 564,158

[22] Filed: Dec. 22, 1983

[51] Int. Cl.$^4$ .............................................. E21B 43/22
[52] U.S. Cl. ................................ 252/8.55 D; 166/274; 260/505 C
[58] Field of Search ............... 252/8.55 D; 260/505 C

[56] References Cited

U.S. PATENT DOCUMENTS

| | | |
|---|---|---|
| 3,835,183 | 9/1974 | Carpenter et al. ............... 260/505 C |
| 4,077,471 | 3/1978 | Shupe et al. ................... 252/8.55 X |
| 4,110,228 | 8/1978 | Tyler et al. ........................ 252/8.55 |
| 4,110,229 | 8/1978 | Carlin et al. ...................... 252/8.55 |
| 4,414,120 | 11/1983 | Mallory et al. ..................... 252/8.55 |
| 4,470,828 | 9/1984 | Yamamura et al. ..................... 44/51 |

*Primary Examiner*—Herbert B. Guynn
*Attorney, Agent, or Firm*—Jack H. Park; Kenneth R. Priem; Harold J. Delhommer

[57] ABSTRACT

A surfactant flooding system for enhanced oil recovery is disclosed which comprises sulfonated creosote oil, as well as a surfactant and solubilizer. The use of sulfonated creosote oil substantially lowers the viscosity of the surfactant system as well as improving the oil recovery efficiency of the system.

11 Claims, No Drawings

SURFACTANT FLOODING SOLUTIONS WITH SULFONATED CREOSOTE

BACKGROUND OF THE INVENTION

This invention relates to the recovery of oil from subterranean formations by water flood operations, and more particularly relates to the use of sulfonated creosote oil as an additive in surfactant flooding systems.

When water flooding alone is used, oil recovery may be limited due to the relatively poor ability of the flood water to displace the oil remaining in the reservoir's pore structure. Because of the structure of the reservoir and relative surface tensions involved, the flood water may form channels or fingers, bypassing the oil in the formation.

Investigations of ways to increase oil recovery by improving the displacement ability of water floods have produced useful surfactants which reduce the interfacial tension between the oil and water in the reservoir. With lower interfacial tension, oil that is trapped in the pore structure can be dispersed into the water as smaller and more easily deformable droplets. Many types of surfactants have been investigated and the choice of which surfactant to employ in a water flood operation is dependent upon the conditions in the reservoir as well as the cost and availability of the surfactants.

Most water flood operations have employed a petroleum sulfonate as a sole surfactant, or at least a major component of a mixture of surfactants. Synthetic alkyl lauryl sulfonates and alkyl sulfonates and sulfates have all been proposed as oil recovery surfactants. To combat separation problems in surfactant mixtures, a material with both water soluble and oil soluble characteristics is usually added to sulfonate surfactant mixtures. These materials are generally referred to as "solubilizers" and are usually sulfate or sulfonate salts of polyethoxylated alcohols or alkylphenols. The choice and concentration of the solubilizer employed is dependent upon the choice of surfactants used.

U.S. Pat. No. 3,835,183 discloses the sulfonation of an intermediate oil fraction of creosote oil by the use of a spent alkylation acid and subsequent neutralization. Further, Chemical Abstracts 113078m discloses a Russian language publication which describes the sulfonation of tar oil followed by neutralization of the sulfonated product to produce surface-active substances which are at least partially water soluble. See, Mikhailenko, G. I., Klimenko, N. G., Babich, L. E., Basova, L. F., Maslo-Zhir. Prom. 1969, 35(12), 35–6.

SUMMARY OF THE INVENTION

A surfactant flooding solution for enhanced oil recovery is disclosed which comprises water, at least one surfactant, at least one solubilizer and a sulfonated creosote oil. The addition of the sulfonated creosote oil to the surfactant flooding solution substantially lowers the viscosity of the surfactant solution as well as improving the oil displacement capability of the system. Oil recovery efficiency is increased and there is no loss in surfactant stability.

DETAILED DESCRIPTION

It is well known that conventional surfactant flooding mixtures are usually composed of one or more petroleum sulfonates, a solubilizer, brine and, optionally, a quantity of hydrocarbon. These components are normally combined to make a surfactant system.

The surfactant system is conventionally injected into the reservoir to form a front followed by the injection of additional brine or water which may contain a mobility control agent. The slug of a surfactant system is usually about 10% to 20% of the pore volume of the reservoir. A typical prior art surfactant system may be:

1. one or more petroleum sulfonates such as
   (a) a water soluble sulfonate having a relatively low equivalent weight and
   (b) an oil soluble sulfonate having a relatively high equivalent weight, or
   (c) any other commercially available petroleum sulfonates;
2. a solubilizer;
3. brine; and
4. optionally, a light hydrocarbon.

The present invention resides in the addition of approximately 0.05% to about 3% by weight, preferably about 0.1% to about 0.8% by weight of sulfonated creosote oil, preferably multi-sulfonated creosote oil to surfactant systems to improve oil displacement capability and lower the viscosity of the surfactant systems. The viscosity improvements result in greater injectivity and mobility control.

The surfactant solution of the present invention is comprised of about 0.5% to about 6.0%, preferably about 2.5% to about 4% by weight of a surfactant such as a petroleum sulfonate, about 0.4% to about 4.0%, preferably about 1% to about 2% by weight of a solubilizer such as ethoxylated alkyl or alkylaryl sulfate or sulfonate, and about 0.05% to about 3.0%, preferably about 0.1% to about 0.8% by weight of sulfonated creosote oil. Well known solubilizers which may be employed are alkoxylated compounds such as alkylpolyalkoxy sulfate, alkylarylpolyalkoxy sulfate, alkylpolyalkoxy sulfonate, and alkylarylpolyalkoxy sulfonate. The surfactants, solubilizer and sulfonated creosote oil comprise a total of about 1% to about 10%, preferably about 3% to about 6% by weight of the solution.

Creosote or coal tar is derived from the fractional distillation of coal tar. This can be accomplished by the pyrolysis of coal in the absence of air. Creosote is a yellowish to dark green-brown, oily liquid which has a wide boiling point range of about 400° F. to about 900° F. The nature and origin of the coal, of course, has a direct effect upon the composition of the creosote oil obtained from the coal. The creosote oil contains a multitude of different compounds including substantial amounts of multiple aromatic ring compounds such as naphthalene and anthracene. In this invention, it is preferred to use creosote oil bottoms, the fraction of creosote oil with a boiling point range of about 650° F. to 900° F. Sulfonated creosote oil can be prepared inexpensively, especially when compared to petroleum sulfonates normally employed in enhanced oil recovery.

A gas chromatograhic analysis of a typical creosote oil with a boiling point range of about 400° F. to about 900° F. is provided below. Numerous compounds contained within the creosote oil with a weight percent of less than about 0.5% were excluded from the table as well as water, mineral matter, ammonia and other gases. Many of the compounds excluded from the below table were naphtalene and anthracene compounds with alkyl side chains.

TABLE I

Gas Chromatographic Analysis of Creosote Oil

| Compound | Weight % |
| --- | --- |
| naphthalene | 5.1 |
| 2-methylnaphthalene | 1.3 |
| 4-indanol | .55 |
| diphenyl | .50 |
| acenaphthene | 6.0 |
| dibenzofuran | 6.7 |
| fluorene | 10.3 |
| 3-methyldiphenylene oxide | 1.7 |
| 9,10-dihydroanthracene | 2.4 |
| 2-methylfuorene | .85 |
| diphenylene sulfide | .52 |
| phenanthrene | 18.6 |
| anthracene | 4.3 |
| 3-methylphenanthrene | .98 |
| carbazole | 2.2 |
| 4,5-methylenephenanthrene | 2.5 |
| 9-methylanthracene | 1.2 |
| 2-methylcarbazole | 1.7 |
| fluoranthene | 5.5 |
| 1,2-benzodiphenylene oxide | .96 |
| pyrene | 2.6 |

Several methods of sulfonating hydrocarbons are well known in the art. Any of several different sulfonation methods may be employed to yield the sulfonated creosote oil used in the present invention for surfactant flooding systems. It is preferred that the sulfonation method be one that will result in multi-sulfonated creosote oil compounds. These can be obtained by sulfonation with sulfuric acid and removal of generated water during the reaction process.

One method of preparing the sulfonated creosote oil compounds used in the surfactant systems of the present invention is by the addition of concentrated sulfuric acid, preferably fuming sulfuric acid. A preferred procedure is to evaporate water from the reaction mixture as it is formed in order to promote multi-sulfonation of the creosote oil compounds. If the water product is not removed, the reaction will soon reach equilibrium and may undergo some reversal without creating the multi-sulfonated compounds.

After the sulfuric acid addition to create sulfonic acid compounds, the reaction mixture should be neutralized by the addition of a base such as sodium hydroxide. Water is again a by-product of the neutralization reaction. It is generally not necessary to remove this water from the reaction mixture as the sulfonated creosote oil compounds will be later diluted in water. But if desired, water can be removed. Neutralization should be performed to a pH of about 7. If the water by-product is stripped off, the remaining product is a brown powder which is water soluble.

It is especially preferred that the creosote oil be placed in a solvent of purified saturated hydrocarbons for the addition of sulfuric acid. Since sulfuric acid, particularly fuming sulfuric acid, is such a strong sulfonation agent, sulfuric acid will burn and char some of the creosote oil compounds. If the creosote oil compounds are placed in a solvent of saturated hydrocarbons of intermediate weight such as $C_7$ to $C_{15}$, preferably $C_{10}$ to $C_{13}$, the solvent will spread and diffuse the sulfuric acid and the resulting reaction heat.

The $C_{10}$ to $C_{13}$ saturated hydrocarbons are extremely difficult to sulfonate. Furthermore, these saturated hydrocarbons easily separate out from the desired sulfonated creosote oil after neutralization of the sulfonic acids. The saturated hydrocarbon solvents are unaffected by the reactants and can be recycled. Thus, they are ideally suited as solvents for the sulfonation reactions and make the product yields much more reproducible. The use of the saturated hydrocarbon solvents results in a higher yield and a smaller proportion of charred product.

It is believed that the sulfonated creosote works very well in surfactant flooding systems because (1) the compounds are multi-sulfonated and (2) they comprise a wide range of molecular weights. The degree of sulfonation can be controlled by (1) the ratio of sulfonating agent to carbonaceous material, (2) the amount of produced water which is allowed to remain in the reaction mixture and (3) the number of possible sulfonation sites on the compounds. If the creosote oil contains more compounds with multiple ring structures, there will be more possible sulfonation sites, yielding more highly sulfonated compounds.

It is preferred to maintain the ratio of sulfuric acid to creosote oil at the amount which will yield 100% conversion of the creosote oil compounds to sulfonated creosote oil compounds. Sulfuric acid is preferably added to the creosote oil in a weight ratio ranging from about ½ to about 3/1 of sulfuric acid/creosote oil. Smaller ratios of acid to oil will result in a yield of sulfonated compounds having a lower degree of sulfonation. If fuming sulfuric acid is used, the added $SO_3$ concentration may vary from about 1% to about 20% by weight. A high concentration of excess $SO_3$ may char some of the product.

An important advantage to the addition of sulfonated creosote oil compounds to surfactant flooding systems is that the sulfonated creosote compounds substantially reduce the viscosity of the surfactant flooding composition at the same time they increase the displacement efficiency of the surfactant flooding system. Solution viscosity is an important factor to consider in chemical flooding for injectivity and mobility control. The viscosity of the flooding system is primarily dependent upon the concentration and viscosity of each component, the concentration of dissolved solids in the brine and the temperature of the system. Increased viscosity of the brine is desirable for more efficient oil displacement, but viscosity that is too high can reduce the displacement rate of the surfactant system, prolonging the length of time required for the enhanced recovery operation. To reduce the viscosity of a surfactant slug, a viscosity control agent is often mixed in at extra cost. Sulfonated creosote bottoms reduce the viscosity of the system up to about 50% at little additional cost, since the compounds can be manufactured very inexpensively.

The following examples will further illustrate the enhanced oil recovery method of the present invention of injecting a surfactant flooding solution containing sulfonated creosote oil. These examples are given by way of illustration and not as limitations on the scope of the invention. Thus, it should be understood that surfactants, solubilizers and amounts of compounds can be varied with the solution still remaining within the scope of the invention.

EXAMPLE 1

The sulfonated creosote oil compounds were prepared in one liter round bottomed flask by charging the flask with a mixture of 300 ml of purified saturated hydrocarbons in the range of $C_{10}$ to $C_{13}$. The majority of the saturated hydrocarbons were $C_{13}$ alkanes. Fifty grams of creosote oil bottoms, a fraction of creosote oil boiling in the range of 650° F. to 900° F., were mixed with the hydrocarbon solvent in the flask. 100 gm of fuming sulfuric acid (15% SO$_3$) was then added. The flask was attached to a rotary evaporator and rotated for 20 minutes under vacuum of approximately 80 to 100 mm of Hg to draw off produced water and permit the sulfonation reaction to continue further towards completion.

A sodium hydroxide solution containing 50 gm of sodium hydroxide per 100 ml of water was then added to the reaction vessel in a quantity needed to neutralize the sulfonic acids to yield a pH of 7. The reaction vessel was again rotated under vacuum for another 20 minutes to ensure complete neutralization. Two phases were formed, a saturated hydrocarbon solvent phase which was completely unchanged by the reaction steps and a product phase containing the sulfonated creosote oil bottoms. The saturated hydrocarbon solvent phase was removed.

A mixture of 40 gm of sodium hydroxide and 50 gm of sodium chloride was then added to the crude reaction product in the aqueous phase. 300 ml of ethyl alcohol were mixed with the product mixture to extract the sulfonated creosote oils from the inorganic salts of sodium chloride and sodium sulfate. The ethanol was then removed by atmospheric distillation yielding sodium creosote oil sulfonates in pure form. The last reaction step of removing the inorganic salts can be dispensed with because the sulfonated creosote oil bottoms will be later diluted in a brine mixture containing similar salts to prepare the surfactant flooding system.

The sulfonated creosote product was sparingly soluble in water and methanol. It was discovered that most water-miscible organic solvents would dissolve the sulfonated creosote oil in the presence of about 10% water. Gas chromatographic analysis was performed on the sulfonated creosote product to obtain the data in Table II below.

TABLE II

| Creosote Starting Matl. | Product Analytical Data | |
|---|---|---|
| 91% C | % C = 33.95 | % S = 10.49 |
| 5.74% H | % H = 2.43 | % Moisture = 3.12 |
| 1.0% N | % N = 0.42 | % Ash = 51.29 |
| 0.7% S | pH of a 1% solution = 9.5 | Brookfield Vis. (#1 spindle) at 0.1% in distilled H$_2$O = 3 cps. |

EXAMPLES 2-15

A surfactant flooding system was prepared to evaluate the use of sulfonated creosote oil in enhanced oil recovery. The surfactant flooding system was made from distilled water to which was added 1.8% TRS-18, 1.8% TRS-40 and 1.4% LN 60 COS. TRS-18 is a trademarked oil soluble sulfonate surfactant having an equivalent weight of about 500 sold by Witco Chemical Co. TRS-40 is a trademarked water soluble sulfonate having an equivalent weight of about 350 sold by Witco Chemical Co. LN 60 COS is a trademarked sulfated derivative of ethoxylated alcohol having approximately 12 to 14 carbon atoms and an average equivalent weight of about 550 sold by Texaco Chemical Co. Two percent sodium chloride was also added to create the base surfactant system. Various concentrations of sulfonated creosote were added to the base system. The capillary displacement and Brookfield viscosity (with a #1 spindle) of the resulting systems were measured. The results are listed in Table III.

The capillary displacement tests were conducted by filling a 5 μp capillary tube with a mixture of 75% crude from a Southern Illinois field having a 35° API gravity and 25% heptane by volume. The capillaries were then immersed in the treating solution. The displacement of oil from the capillary tubes by the surfactant flooding systems was measured in millimeters after 20 minutes.

The sulfonated creosote added to the base system in Example 3 is referred to as raw creosote and was prepared from creosote oil having a boiling point range of about 400° to 900° F. The sulfonated creosote used in all of the remaining examples was prepared from creosote bottoms having a boiling point range of about 650° to 900° F. Examples 5-9 denoted creosote bottoms #2 were prepared from one batch of sulfonated creosote bottoms. The sulfonated creosote bottoms #3 in Example 11 and 12 were prepared from a separate sulfonated batch of creosote bottoms as were those of Examples 14 and 15.

Substantial decreases in viscosity can be noted throughout Table III between the base surfactant flooding system and the surfactant system containing sulfonated creosote. For instance, the surfactant system of Example 3 offered a substantial 43% decrease in viscosity from 12.2 cp to 7.0 cp while at the same time increasing capillary displacement a surprisingly large 33%. Similar results in viscosity reduction existed for all of the remaining example groups.

TABLE III

| Ex. | Sample | Capillary Displacement (mm) | Brookfield Viscosity (cp) |
|---|---|---|---|
| 2 | Base System | 4.7 | 12.2 |
| 3 | 0.5% Raw Creosote #1 in Base System | 7.0 | 7.0 |
| 4 | Base System | 4.7 | 12.4 |
| 5 | 0.5% Creosote Bottoms #2 in Base System | 5.9 | 7.8, 7.0 |
| 6 | 0.4% Creosote Bottoms #2 in Base System | 5.0 | 7.3 |
| 7 | 0.3% Creosote Bottoms #2 in Base System | 4.5 | 5.5 |
| 8 | 0.2% Creosote Bottoms #2 in Base System | 4.8 | 7.4 |
| 9 | 0.1% Creosote Bottoms #2 in Base System | 5.2 | 6.6 |
| 10 | Base System | 4.8, 4.8 | 10.4 |
| 11 | 0.5% Creosote Bottoms #3 in Base System | 4.0, 4.3, 4.3 | 9.28 |
| 12 | 0.6% Creosote Bottoms #3 in Base System | 4.6, 4.8 | 10.0 |
| 13 | Base System | ~4.7 | ~12 |
| 14 | 0.5% Creosote Bottoms #4 in Base System | 3.5, 3.4, 3.5, 3.4 | 6.7 |
| 15 | 0.6% Creosote Bottoms #4 in Base System | 5.5, 6.0 | 7.1 |

Many other variations and modifications may be made in the concepts described above by those skilled in the art without departing from the concepts of the present invention. Accordingly, it should be clearly understood that the concepts disclosed in the description are illustrative only and are not intended as limitation on the scope of the invention.

What is claimed is:

1. An aqueous surfactant solution for injection into an underground hydrocarbon formation to increase hydrocarbon recovery comprising water, about 0.5% to about 6.0% by weight of a petroleum sulfonate surfactant, about 0.4% to about 4.0% by weight of a solubilizer selected from alkoxylated compounds of the group consisting of alkylpolyalkoxy sulfates, alkylarylpolyalkoxy sulfates, alkylpolyalkoxy sulfonates alkylarylpolyalkoxy sulfonates and mixtures thereof and about 0.05% to about 3.0% by weight of a sulfonated creosote oil to decrease the viscosity of the aqueous surfactant solution, said total of surfactant, solubilizer and sulfonated creosote constituting about 1% to about 10% by weight of the total solution.

2. The aqueous solution of claim 1, wherein the solubilizer is a mixture of said alkoxylated compounds.

3. The aqueous solution of claim 1, wherein the water is connate water produced from the formation.

4. The aqueous solution of claim 1, wherein the majority of the sulfonated creosote compounds are multisulfonated.

5. The aqueous solution of claim 1, wherein the sulfonated creosote is prepared from a creosote oil fraction with a boiling point range of about 600° F. to 950° F.

6. The aqueous solution of claim 1, wherein the sulfonated creosote comprises about 0.1% to about 0.8% by weight of the solution.

7. The aqueous solution of claim 1, wherein the amount of surfactant is about 2.5% to about 4% by weight, the amount of solubilizer is about 1% to about 2% by weight, and the amount of sulfonated creosote oil is about 0.1% to about 0.8% by weight of the solution, said total of surfactant, solubilizer and sulfonated creosote oil constituting about 3% to about 6% by weight of the total solution.

8. The aqueous solution of claim 1, wherein the sulfonated creosote is prepared by
(a) adding sulfuric acid to creosote oil,
(b) removing water from the reaction mixture, and
(c) adding a solution to the reaction mixture to neutralize the sulfonic acid in the reaction mixture.

9. The aqueous solution of claim 8, wherein the creosote oil is mixed with saturated hydrocarbons having about seven to about fifteen carbon atoms prior to addition of the sulfuric acid.

10. The aqueous solution of claim 8, wherein water is removed from the reaction mixture after the sulfonic acid is neutralized.

11. The aqueous solution of claim 8, wherein a sodium hydroxide solution is employed to neutralize the sulfonic acid.

* * * * *